US009151133B2

(12) United States Patent
Telliskivi et al.

(10) Patent No.: US 9,151,133 B2
(45) Date of Patent: Oct. 6, 2015

(54) METAL SEAL

(75) Inventors: Tanel Telliskivi, Drammen (NO); André M. Smith, Lier (NO); Birgir Amrén, Onsala (SE)

(73) Assignee: Aker Subsea AS, Lysaker (NO)

( * ) Notice: Subject to any disclaimer, the term of this patent is extended or adjusted under 35 U.S.C. 154(b) by 488 days.

(21) Appl. No.: 13/395,938

(22) PCT Filed: Oct. 14, 2010

(86) PCT No.: PCT/EP2010/065418
§ 371 (c)(1),
(2), (4) Date: Mar. 14, 2012

(87) PCT Pub. No.: WO2011/048005
PCT Pub. Date: Apr. 28, 2011

(65) Prior Publication Data
US 2012/0169013 A1 Jul. 5, 2012

(30) Foreign Application Priority Data
Oct. 20, 2009 (NO) .................................... 20093178

(51) Int. Cl.
E21B 33/04 (2006.01)
F16J 15/32 (2006.01)
F16J 15/08 (2006.01)
E21B 33/00 (2006.01)

(52) U.S. Cl.
CPC ............. *E21B 33/04* (2013.01); *F16J 15/3236* (2013.01); *E21B 2033/005* (2013.01); *F16J 15/0806* (2013.01)

(58) Field of Classification Search
CPC ................................ F16J 15/02; F16J 15/128

USPC ........... 285/347, 374, 917; 277/650–654, 644
See application file for complete search history.

(56) References Cited

U.S. PATENT DOCUMENTS 3,272,521 A * 9/1966 McNenny ...................... 277/467
3,285,615 A * 11/1966 Trbovich ....................... 277/639
(Continued)

FOREIGN PATENT DOCUMENTS

GB 2217795 A 11/1989
GB 2244502 A 12/1991
GB 2355479 A 4/2001

OTHER PUBLICATIONS

Strømmen, Henrik, "International Search Report" for PCT/EP2010/065418, as mailed Jun. 1, 2011, 3 pages.

*Primary Examiner* — Vishal Patel
(74) *Attorney, Agent, or Firm* — Winstead PC

(57) ABSTRACT

Seal assembly (201) for a subsea well assembly with inner and outer circular sealing surfaces (215a, 215b) in an annulus (211). It has a seal ring (203) with a cross section exhibiting two legs (205a, 205b), with seal ring seal surfaces (209a, 209b). The seal ring comprises a main metal section (217) having metal with the same or higher degree of hardness than the metal in said facing circular sealing surfaces (215a, 215b). The seal ring seal surfaces comprise a seal ring surface metal (210a, 210b) which is of a softer metal than the metal in the circular sealing surfaces (215a, 215b) and the metal in the main metal section (217). The seal ring (203) comprises a second section (219) comprising said seal ring surface metal (210a, 210b), the second section (219) extending continuously between said seal ring seal surfaces (209a, 209b) on the respective legs.

6 Claims, 3 Drawing Sheets

(56) References Cited

U.S. PATENT DOCUMENTS

| | | |
|---|---|---|
| 3,378,269 A | 4/1968 | Castor |
| 4,477,087 A * | 10/1984 | Sutter et al. .................. 277/644 |
| 4,742,874 A | 5/1988 | Gullion |
| 5,044,672 A | 9/1991 | Skeels et al. |
| 5,174,376 A | 12/1992 | Singeetham |
| 6,322,087 B1 * | 11/2001 | Swensen et al. .............. 277/626 |
| 6,367,558 B1 | 4/2002 | Borak, Jr. |
| 6,540,234 B1 * | 4/2003 | Atkinson et al. .............. 277/612 |
| 6,869,079 B2 | 3/2005 | Zheng |
| 6,926,283 B2 * | 8/2005 | Janoff et al. .................. 277/603 |
| 6,983,940 B2 * | 1/2006 | Halling ......................... 277/604 |
| 7,559,366 B2 | 7/2009 | Hunter et al. |

* cited by examiner

METAL SEAL

The present invention relates to a metal-to-metal seal assembly for sealing between circular members of a subsea well assembly.

BACKGROUND

In the field of subsea wells, the requirement of pressure ranges of the well assemblies is continuously increasing. This leads to corresponding increased technical requirements of the seal assemblies employed in such wells.

Metal-to-metal seals have been used for a long time with various designs. One of the challenges of such seals is that the metal used in the seal may experience tension beyond the yield strength of the material in the seal. Thus, when a pressure is removed the seal may have altered its shape, and may not be able to function properly with the next or a later exposure of high pressure. Hence, one wants to use a sealing member which shape is not permanently altered after exposure to a high pressure.

Further, a standard or prerequisite is that the metal in a sealing member, such as a sealing ring, is softer than the metal in the facing sealing surface. In other words, the metal in the part being easily substituted should be softer than the metal in the other. Also, this metal should be sufficiently soft to make it yield in the position of contact against the facing sealing surface, in order to provide for a tight seal.

Thus, these two objects are to some extent in contradiction to each other.

Patent application GB 2 217 795 exhibits a V-shaped seal element with a cross section showing two sealing legs. The two legs can be forced against an opposite facing sealing surface by two secondary legs which can be forced in a wedging manner between the said sealing legs.

U.S. Pat. No. 5,044,672 describes another metal-to-metal seal with a circular seal element having a cross section with two legs which form a V-shape.

Each leg exhibits a sealing surface which is forced against opposite sealing surfaces of elements of a subsea well assembly.

U.S. Pat. No. 5,174,376 also describes a seal assembly with a metallic seal element having a U-shaped cross section.

Furthermore, patent publication U.S. Pat. No. 7,559,366 yet another embodiment of a metal-to-metal seal. Here, an H-shaped sealing ring (or alternatively, to V-shapes arranged against each other) is forced against facing sealing surfaces by a wedging member which is forced into the space between the legs of the seal ring. In addition, the description mentions the possibility to arrange a layer of a softer metal on the side of the seal ring, in order to seal possible scratches or rifts in the facing sealing surface.

U.S. Pat. No. 6,367,558 B1 describes a metal seal with a cross section that exhibits two legs. A band of a softer metal than the metal of the rest of the seal is attached to the outside of the legs, for contact against an opposite sealing surface.

As briefly mentioned above, with continuously increasing pressure rates, the seals must be designed correspondingly. Both the need for a "soft" metal of the sealing member, with respect to the facing sealing surface, as well as the need for a sealing member which shape does not become permanently altered, must be met.

THE INVENTION

According to the invention, a metal-to-metal seal assembly for a subsea well assembly is provided. The assembly comprises an inner circular sealing surface and an outer opposite circular sealing surface arranged in an annulus, wherein said sealing surfaces define a narrowed annulus cross section with respect to an adjacent part of the annulus. The seal assembly further comprises a seal ring with a cross section exhibiting two legs. The legs are adapted to be elastically bent and forced towards each other when the seal ring is forced into said narrowed annulus cross section from said adjacent part of the annulus. The seal ring further exhibits seal ring seal surfaces on a respective outer end section of each of said legs, which are arranged to seal against said inner and outer circular sealing surfaces. The seal ring comprises a main metal section which is of a metal with the same or higher degree of hardness than the metal in said facing inner and outer circular sealing surfaces. Moreover, said seal ring seal surfaces comprise a seal ring surface metal which is of a softer metal than the metal in the inner and outer circular sealing surfaces and the metal in the main metal section. According to the invention, the seal ring comprises a second section comprising said seal ring surface metal, the second section extending continuously between said seal ring seal surfaces on the respective legs. This is advantageous in order to keep the softer seal ring surface metal in place during use.

Thus, the invention provides a seal ring which can be used under high pressure conditions without risk of permanently altering its shape. The softer seal ring surface metal makes it unnecessary to provide an inlay in the circular sealing surfaces of the annulus which is softer than that of the main metal section of the seal ring. Hence, costly fabrication of the large units, such as a tubing hanger and stinger, against which the seal assembly is adapted to seal, is avoided, since a particular inlay of a hard material will not have to be provided.

Furthermore, the second section may advantageously extend along the main metal section, in the space between the legs. Also preferable, the seal ring can have a pressure-facing side and the second section can extend along the main metal section on said pressure facing side. The pressure will then contribute in keeping the second section in place on the seal ring. This will be further described with reference to an example of embodiment below.

The two legs of the main metal section can further exhibit a part extending from their basis, in direction towards their ends, with continuously declining cross section thickness. This results in a strong force-absorbing characteristic of the legs, making them able to withstand high pressure without being permanently deformed. In this part, there will be no points of extensive steps of stress in the material. With continuously decreasing is meant that it contains no parallel sections. However, as will appear from the detailed discussion of an example embodiment below, it may comprise a variation of inclination between the inner and outer cross section surface of a leg or even a step in thickness. The person skilled in the art will appreciate that with such a cross section of the legs, the thickness of the leg can be adapted to the moment of force which can be expected at the respective positions in the leg, when the seal ring is in the sealing position, and with a force operating on it due to fluid pressure. Preferably, the said part with continuously declining cross section thickness from the basis of the legs extends from said basis, to a point where the leg exhibits the metal of the second section on each side of the leg. This is illustrated in the accompanying drawings which will be described below.

When in a sealing position, one or both of the two legs of the main metal section will preferably exhibit a part of the leg which is without contact to a surface of said annulus. This is, at least partly, a result of a short entering distance. A short entering distance for the seal ring into the sealing position reduces wearing and the risk of scratches on the sealing surfaces.

EXAMPLE OF EMBODIMENT

In the following, a preferred example of embodiment will be described with reference to the accompanying figures, in which FIG. 1 is a cross section view of a part of a well assembly, comprising a seal assembly according to the invention;

Figure 1:
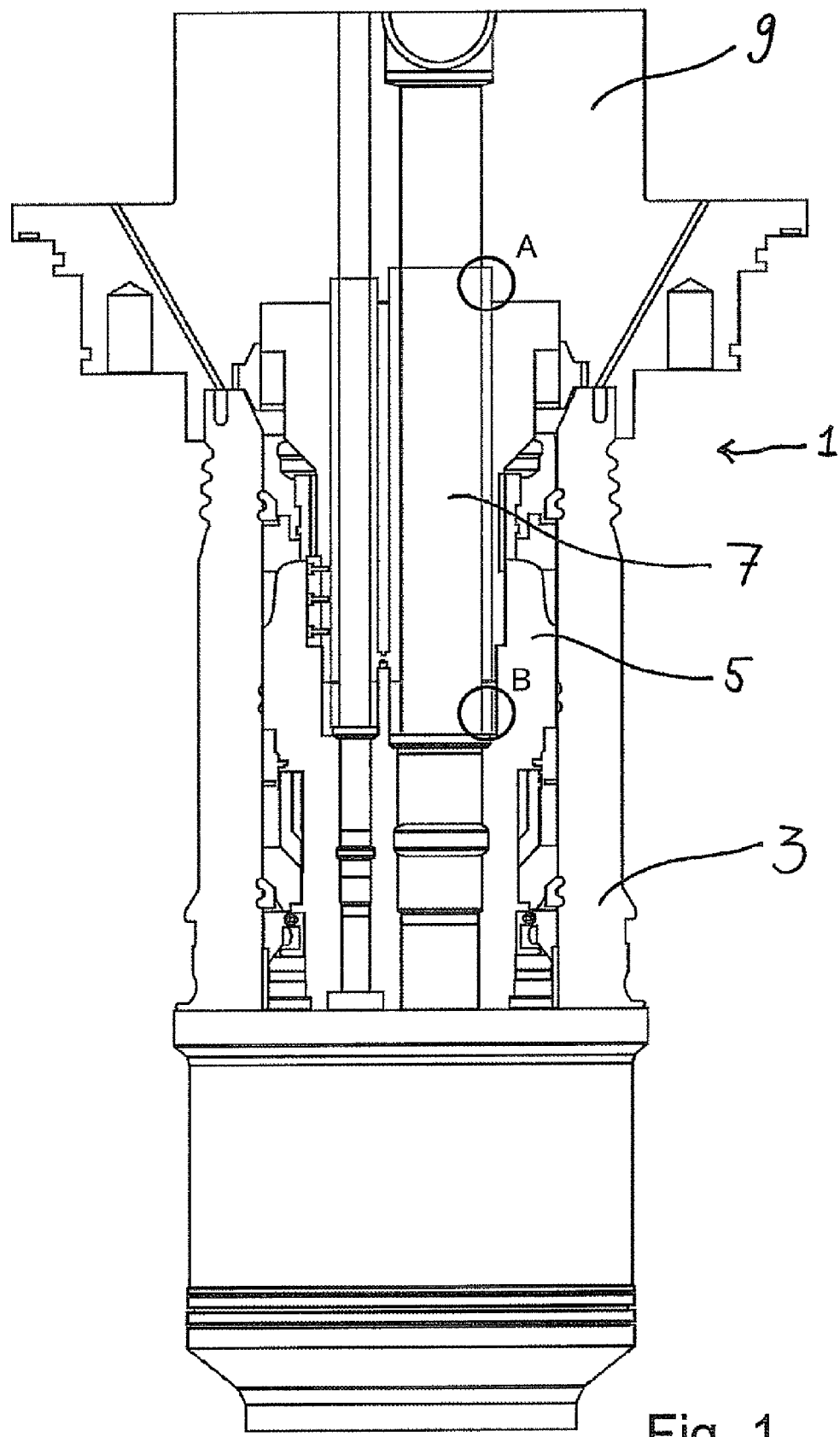
Figure 3:
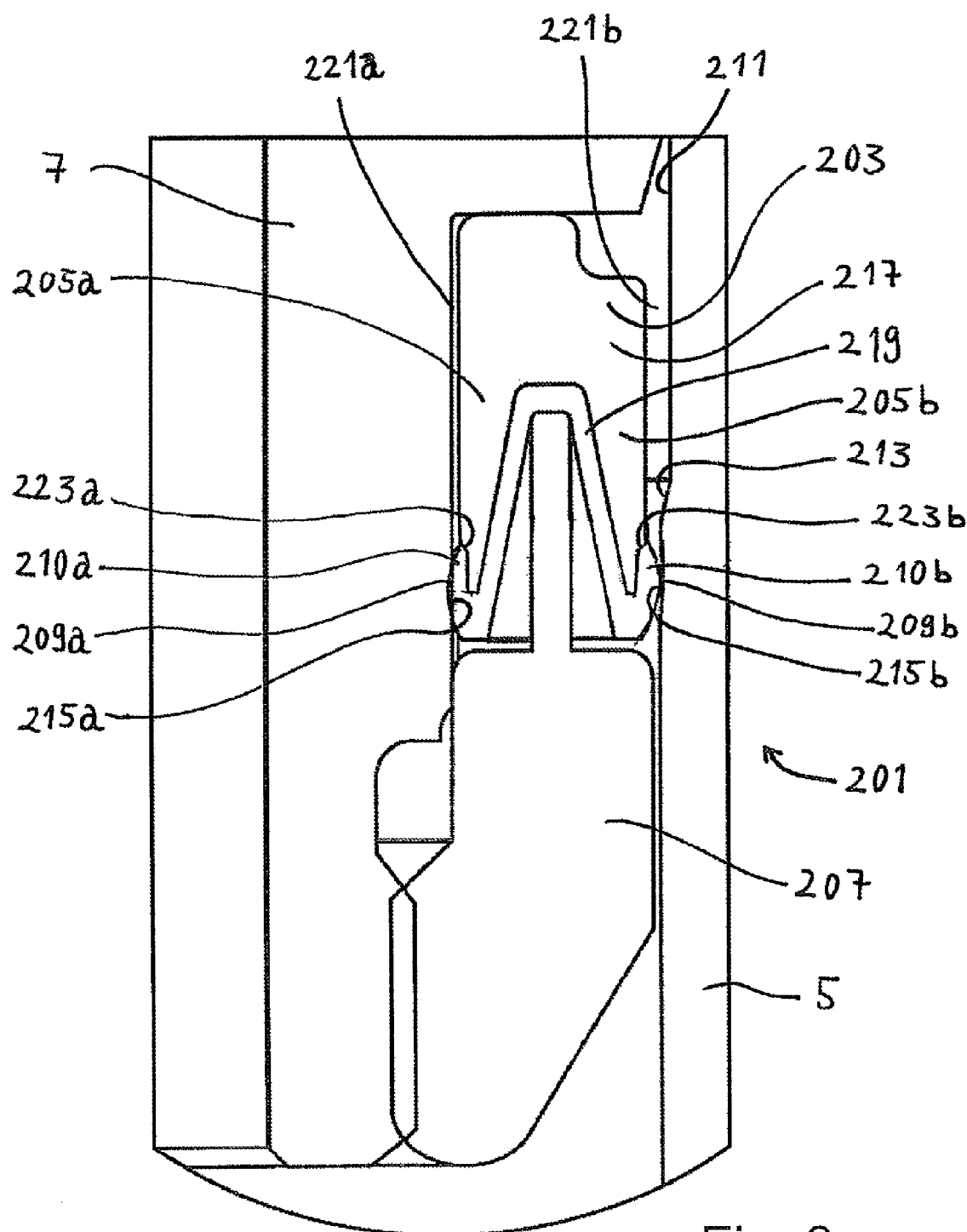
FIG. 3 is a cross section view of a seal assembly according to the present invention.

FIG. 1 shows a subsea well assembly 1. It has a well head 3 into which is arranged a tubing hanger 5. Into a bore of the tubing hanger 5 extends a stinger assembly 7. The stinger assembly 7 also extends into a bore of a Xmas tree spool body 9 at its upper end. In the positions A and B, the stinger assembly 7 is sealed to said bores with a seal assembly according to the present invention. Such a seal assembly is shown in FIG. 3.

Figure 2:
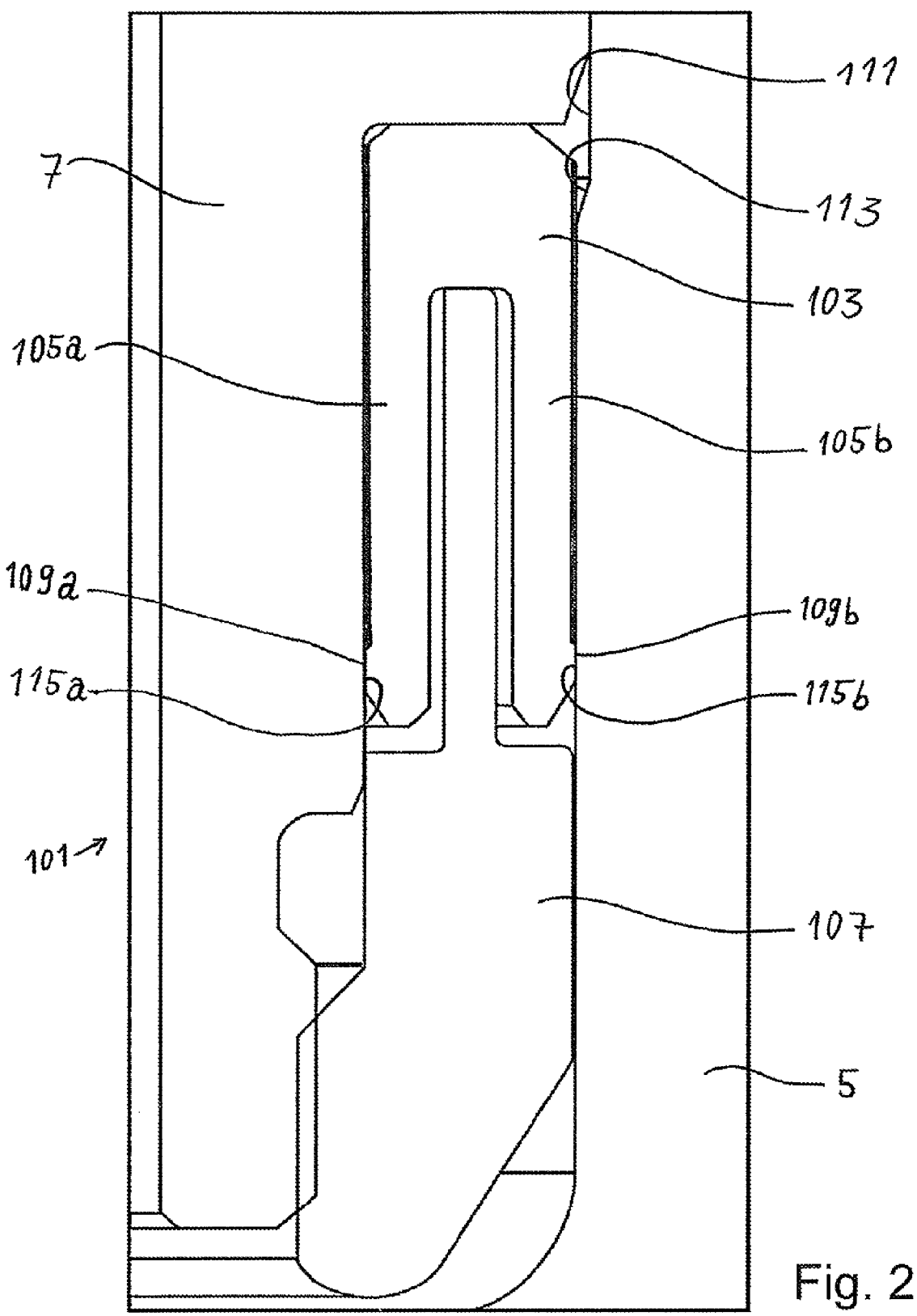
FIG. 2 is a cross section view of a known seal assembly.

FIG. 2 shows a seal assembly 101 known from prior art. The assembly has a seal ring 103 comprising two legs 105a and 105b. The seal ring 103 is held in place with a retainer nut 107 having an extension into the space between the legs 105a, 105b of the seal ring 103.

The seal ring 103 is arranged in an annulus bore 111 between the tubing hanger 5 and the stinger assembly 7. With the orientation shown in FIG. 2, the seal ring 103 is moved into the sealing position in a downward direction. During this movement, the seal ring 103 is moved from a part of the annulus bore 111 having a larger radial space, to a narrowed space in the sealing position. During said movement the leg 105b slides past an inclined tensioning surface 113. Thus, in the sealing position shown, the legs 105a, 105b have been pressed towards each other. This ensures a tensioning of the legs 105a, 105b against the inner and outer circular sealing surfaces.

At the end sections of the two legs 105a, 105b, there are arranged seal ring seal surfaces 109a, 109b. When in a sealing position, as shown in FIG. 2, the seal ring seal surfaces 109a, 109b abut against facing circular seal surfaces of the stinger assembly 7 and the tubing hanger 5, respectively.

Characteristic to this prior art seal assembly, one should note the travelling distance of the seal ring seal surfaces 109a, 109b from the inclined tensioning surface 113 to the sealing position shown. This travelling distance is carried out while the legs are outwardly tensioned, and may result in unnecessary wearing of the seal ring seal surfaces 109a, 109b. This can be overcome, as will appear from the embodiment of a seal assembly according to the invention (FIG. 3), by arranging the inclined tensioning surface closer to the inner and outer sealing surface 115a, 115b of the annulus bore. However, with a sealing ring 103 as shown in FIG. 2, this may result in a permanent altering of the shape of the sealing ring legs 105a, 105b. A sufficiently high pressure at the lower side of the seal ring 103 (with respect to FIG. 2) will make the legs 105a, 105b curve out. When the pressure decreases or disappears, the tension of the legs 105a, 105b may then move the seal ring seal surfaces 109a, 109b out of contact with the facing circular seal faces 115a, 115b. The seal arrangement would then not be able to seal again during the next pressure rise.

FIG. 3 shows a preferred embodiment of a metal-to-metal seal assembly 201 according to the present invention. A seal ring 203 is arranged in an annulus bore 201 between a tubing hanger 5 and a stinger assembly 7. The seal ring 203 exhibits a cross section with two legs 205a, 205b. At the end part of each leg 205a, 205b is arranged a seal ring seal surface 209a, 209b. According to the present invention, the seal ring seal surfaces 209a, 209b are provided with a seal ring surface metal 210a, 210b, which metal is softer than that of the outer and inner circular sealing surfaces 215a, 215b. In addition, the seal ring surface metal 210 is also softer than that of a seal ring main metal section 217. The main metal section 217 constitutes the substantial form and strength of the seal ring 203.

In this preferred embodiment of the present invention, the seal ring surface metal 210 is extended about the end points of the two legs 205a, 205b, and is further extended along the inwardly facing sides of the said legs, into a continuous second section 219 of the seal ring 203. This particular arrangement of continuous second section 219 contributes on preventing the soft seal ring surface metal 210a, 210b falling of the main metal section 217. In use the seal ring 203 may thus be exposed to large forces without risk of the soft material becoming separated from the seal ring 203.

Advantageously, the second section 219 having this softer metal is arranged on the side of the seal ring 203 which is adapted to face a high pressure. (I.e. the lower side of the seal ring in FIG. 3). A high pressure will thus press the second section 219 against the main metal section 217. Should a crack exist between the second section 219 and the main metal section 217, then the pressure will not be able to enter into the crack and separate the sections.

A retainer nut 207 contributes in keeping the seal ring 203 in the correct sealing position.

In the embodiment according to the invention, shown in FIG. 3, the inclined tensioning surface 213 is arranged much closer to the inner and outer circular sealing surfaces 215a, 215b. Moreover, a part of the outer leg 205b has a gap 221b to the facing surface of the annulus bore 213. Since the seal ring surface metal 210a, 210b extends radially beyond the main metal section 217, there is also a small gap 221a between a part of the inner leg 205a and the inner face of the annulus bore 211 (i.e. the facing surface of the stinger assembly 7).

To prevent the legs 205a, 205b of the seal ring 203 from being bent into a permanently changed shape during exposure to a high pressure (from below in FIG. 3), the main metal section 217 of the seal ring 203 is fabricated in a relatively hard metal. Because of the softer sealing surface metal 210a, 210b on the seal ring seal surfaces 209a, 209b, the main metal section 217 can even be harder than the metal of the inner and outer seal ring seal surface 209a, 209b.

Another advantage of the shape of the legs 205a, 205b is that between their basis (i.e. the start of the leg shape from the rest of the seal ring 203) and a point further out on the leg 205a, 205b, they exhibit a continuously and evenly decreasing cross section. In the shown embodiment, this point is the point where the seal ring surface metal 210a, 210b extends towards the leg basis on the outer surfaces of the each leg 205a, 205b. At this point, the cross section is still decreasing in the direction of the end parts of the legs, but a step 223a, 223b is introduced in which the ends of the second section cross section is positioned. Thus, due to this step or recess, the exposed interface between the second section 219 and the main metal section 217 can be made without any significant steps in the overall outer surfaces of the seal ring 203.

As an example, the main metal section 217 of the seal ring 203 can preferably be made in Inconel 718 (724 MPa). The metal of the seal ring surface metal 210a, 210b, or the second section 219, respectively, can preferably be made in Inconel 825 (241 MPa). Inconel is known by the person skilled in the art, and is a trademark of the Special Metals Corporation.

The invention claimed is:

1. A metal-to-metal seal assembly for a subsea well assembly, comprising:
   an inner circular sealing surface;
   an outer opposite circular sealing surface, the inner circular sealing surface and the outer opposite circular sealing surface defining an annulus;
   a narrowed annulus cross section defined by the inner circular sealing surface and the outer opposite circular sealing surface;
   a seal ring with a cross section comprising a first leg and a second leg, each of the first leg and the second leg having a first region having a first cross-sectional width and a second region having a second cross-sectional width, a first step being disposed on the first leg between the first region and the second region and a second step being disposed on the second leg between the first region and the second region;
   wherein the first leg and the second leg are elastically bent and forced towards each other when the seal ring is forced into said narrowed annulus cross section from an adjacent part of the annulus, wherein the seal ring exhibits seal ring seal surfaces on a respective outer end section of each of the first leg and the second leg which are arranged to seal against the inner circular sealing surface and the outer opposite circular sealing surface;
   wherein said seal ring comprises a main metal section which is of a metal with a same or higher degree of hardness than a metal in said inner and outer circular sealing surfaces;
   wherein the inner circular sealing surface and the outer opposite circular sealing surface comprise a seal ring surface metal which is of a softer metal than the metal in the inner and outer circular sealing surfaces and the metal in the main metal section; and
   wherein the seal ring comprises a second section comprising said seal ring surface metal, the second section extending continuously between said seal ring seal surfaces on the first leg and the second leg, such that the first leg and the second leg exhibit the seal ring surface metal around respective outwardly facing sides of the first leg and the second leg beginning at the first step and ending at the second step, wherein the second section extends along the main metal section in a space between the first leg and the second leg and about end points of the first leg and the second leg.

2. The metal-to-metal seal assembly according to claim 1, wherein the first leg and the second leg extend outwardly from a solid base body.

3. The metal-to-metal seal assembly according to claim 1, wherein the seal ring has a pressure-facing side and that the second section extends along the main metal section on said pressure facing side.

4. The metal-to-metal seal assembly according to claim 1, wherein the first leg and the second leg of the main metal section exhibit a part extending from their basis, in direction towards their ends, with continuously declining cross section thickness.

5. The metal-to-metal seal assembly according to claim 4, wherein said part with continuously declining cross section thickness extends to a point where the first leg and the second leg exhibit said seal ring surface metal on outwardly facing sides of the first leg and the second leg.

6. The metal-to-metal seal assembly according to claim 1, wherein when in a sealing position, one or both of the first leg and the second leg of the main metal section exhibit a part of the leg which is without contact to a surface of said annulus.

* * * * *